United States Patent
Huang et al.

(10) Patent No.: US 8,761,104 B2
(45) Date of Patent: Jun. 24, 2014

(54) METHOD AND APPARATUS FOR TRANSMITTING LOAD INFORMATION AMONG NODES IN A RADIO SYSTEM

(75) Inventors: Min Huang, Beijing (CN); Lei Du, Beijing (CN); Jing Xiu Liu, Beijing (CN)

(73) Assignee: Nokia Siemens Networks Oy, Espoo (FI)

( * ) Notice: Subject to any disclaimer, the term of this patent is extended or adjusted under 35 U.S.C. 154(b) by 43 days.

(21) Appl. No.: 13/378,506

(22) PCT Filed: Jun. 18, 2009

(86) PCT No.: PCT/EP2009/057642
§ 371 (c)(1),
(2), (4) Date: Dec. 15, 2011

(87) PCT Pub. No.: WO2010/145710
PCT Pub. Date: Dec. 23, 2010

(65) Prior Publication Data
US 2012/0087276 A1 Apr. 12, 2012

(51) Int. Cl.
H04W 4/00 (2009.01)
H04W 72/00 (2009.01)
H04B 1/00 (2006.01)
H04B 15/00 (2006.01)

(52) U.S. Cl.
USPC ............................ 370/329; 455/453; 455/63.1

(58) Field of Classification Search
USPC ............................ 370/328, 329; 455/453, 63.1
See application file for complete search history.

(56) References Cited

U.S. PATENT DOCUMENTS

| | | | |
|---|---|---|---|
| 2001/0053695 A1* | 12/2001 | Wallentin | 455/436 |
| 2007/0178831 A1* | 8/2007 | Takeda et al. | 455/7 |
| 2009/0005119 A1 | 1/2009 | Patel et al. | 455/562.1 |
| 2009/0262675 A1* | 10/2009 | Tsai, Jr. | 370/311 |

FOREIGN PATENT DOCUMENTS

EP 1 549 101 A2 6/2005
EP 2 007 163 A2 12/2008

OTHER PUBLICATIONS

Orange: "On Traffic Load Reporting in LTE" 3GPP Draft; R3-060426, 3rd Generation Partnership Project (3GPP), Mobile Competence Centre ; 650, Route Des Lucioles ; F-06921 Sophia-Antipolis Cedex ; France, vol. RAN WG3, no. Sophia Antipolis, France; 20060330, Mar. 30, 2006, (8 pages).
3GPP TS 36.423 V8.5.0 (Mar. 2009), Technical Specification, $3^{rd}$ Generation Partnership Project; Technical Specification, $3^{rd}$ Generation Partnership Project; Technical Specification Group Radio Access Network; Evolved Universal Terrestrial Radio Access Network (E-UTRAN); X2 Application Protocol (X2AP), (Release 8), (100 pages).
3GPP TR 36.814 V0.4.1 (Feb. 2009), Technical Report, $3^{rd}$ Generation Partnership Project; Technical Specification Group Radio Access Network; Further Advancements for E-UTRA Physical Layer Aspects (Release 9), (31 pages).

(Continued)

*Primary Examiner* — Ronald Abelson
(74) *Attorney, Agent, or Firm* — Harrington & Smith (57) ABSTRACT

An apparatus includes means for providing load information, said load information for sending from one of an access node and a relay node associated with said access node to the other of said relay node and access node.

29 Claims, 7 Drawing Sheets (56) References Cited

OTHER PUBLICATIONS

3GPP TR 36.913 V8.0.1 (Mar. 2009), Technical Report, 3rd Generation Partnership Project; Technical Specification Group Radio Access Network; Requirements for further advancements for Evolved Universal Terrestrial Radio Access (E-UTRA) (LTE-Advanced), (Release 8), 15 pages.

3GPP TS 36.300 V8.8.0 (Mar. 2009) Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), (157 pages).

3GPP TS 36.321 V8.5.0 (Mar. 2009), Technical Specification, 3rd Generation Partnership Project; Technical Specification Group Radio Access Network; Evolved Universal Terrestrial Radio Access (E-UTRA); Medium Access Control (MAC) protocol specification (Release 8), (46 pages).

* cited by examiner

METHOD AND APPARATUS FOR TRANSMITTING LOAD INFORMATION AMONG NODES IN A RADIO SYSTEM

FIELD OF THE INVENTION

The present invention relates to a method and apparatus and in particular but not exclusively for use in an arrangement using relays.

BACKGROUND

A communication system can be seen as a facility that enables communication sessions between two or more entities such as mobile communication devices and/or other associated with the communication system. A communication system and a stations compatible communication device typically operate in accordance with a given standard or specification which sets out what the various entities associated with the system are permitted to do and how that should be achieved. For example, the standard or specification may define if a communication device is provided with a circuit switched carrier service or a packet switched carrier service or both. Communication protocols and/or parameters which shall be used for the connection are also typically defined. For example, the manner how the communication device can access the communication system and how communication shall be implemented between communicating devices, the elements of the communication network and/or other communication devices is typically based on predefined communication protocols.

In a wireless communication system at least a part of the communication between at least two stations occurs over a wireless link. Examples of wireless systems include public land mobile networks (PLMN), satellite based communication systems and different wireless local networks, for example wireless local area networks (WLAN). The wireless systems can be divided into cells, and are therefore often referred to as cellular systems.

A user can access the communication system by means of an appropriate communication device. A communication device of a user is often referred to as user equipment (UE). A communication device is provided with an appropriate signal receiving and transmitting arrangement for enabling communications with other parties. Typically a communication device is used for enabling the users thereof to receive and transmit communications such as speech and data. In wireless systems a communication devices provides a transceiver station that can communicate with e.g. a base station of an access network servicing at least one cell and/or another communications device. Depending on the context, a communication device or user equipment may also be considered as being a part of a communication system. In certain applications, for example in ad-hoc networks, the communication system can be based on use of a plurality of user equipment capable of communicating with each other.

The communication may comprise, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. The user may also be provided broadcast or multicast content. Non-limiting examples of the content include downloads, television and radio programs, videos, advertisements, various alerts and other information.

$3^{rd}$ Generation Partnership Project (3GPP) is standardizing an architecture that is known as the long-term evolution (LTE) of the Universal Mobile Telecommunications System (UMTS) radio-access technology. The aim is to achieve, inter alia, reduced latency, higher user data rates, improved system capacity and coverage, and reduced cost for the operator. A further development of the LTE is referred to herein as LTE-Advanced. The LTE-Advanced aims to provide further enhanced services by means of even higher data rates and lower latency with reduced cost. The various development stages of the 3GPP LTE specifications are referred to as releases.

Since the new spectrum bands for international mobile telecommunications (IMT) contain higher frequency bands and LTE-Advanced is aiming at a higher data rate, coverage of one Node B (base station) can be limited due to the high propagation loss and limited energy per bit. Relaying has been proposed as a possibility to enlarge the coverage. Apart from this goal of coverage extension, introducing relay concepts may also help in the provision of high-bit-rate coverage in a high shadowing environment, reducing average radio-transmission power at the User Equipment (UE). This may lead to long battery life, enhanced cell capacity and effective throughput, e.g., increasing cell-edge capacity, balancing cell load, enhancing overall performance, and reducing deployment costs of radio access networks (RAN). The relaying would be provided by entities referred to as Relay stations (RSs) or Relay Nodes (RNs). The relay nodes can be fixed or mobile, for example mounted to a high-speed train. In some systems the relay stations may be opportunistically available user equipment/mobile terminals that are not owned by the network itself.

SUMMARY OF THE INVENTION

According to one aspect of the invention, there is provided an apparatus comprising:
  means for providing load information, said load information for sending from one of an access node and a relay node associated with said access node to the other of said relay node and access node.

According to another aspect of the invention, there is provided a method comprising:
  sending load information from one of an access node and a relay node associated with said access node to the other of said relay node and access node.

DESCRIPTION OF DRAWINGS

For a better understanding of some embodiments of the invention, reference will be made by way of example only to the accompanying drawings in which.

DETAILED DESCRIPTION OF SOME
EMBODIMENTS OF THE INVENTION

As specified in 3GPP TR 36.814 (Third Generation Partnership Project) relaying is considered as one of the potential techniques for LTE-A where a RN is wirelessly connected to the radio-access network via a donor cell. Some embodiments of the invention are described in the context of the LTE-A proposals. However, other embodiments of the invention can be used in any other scenario which for example requires or uses one or more relays.

Figure 1:
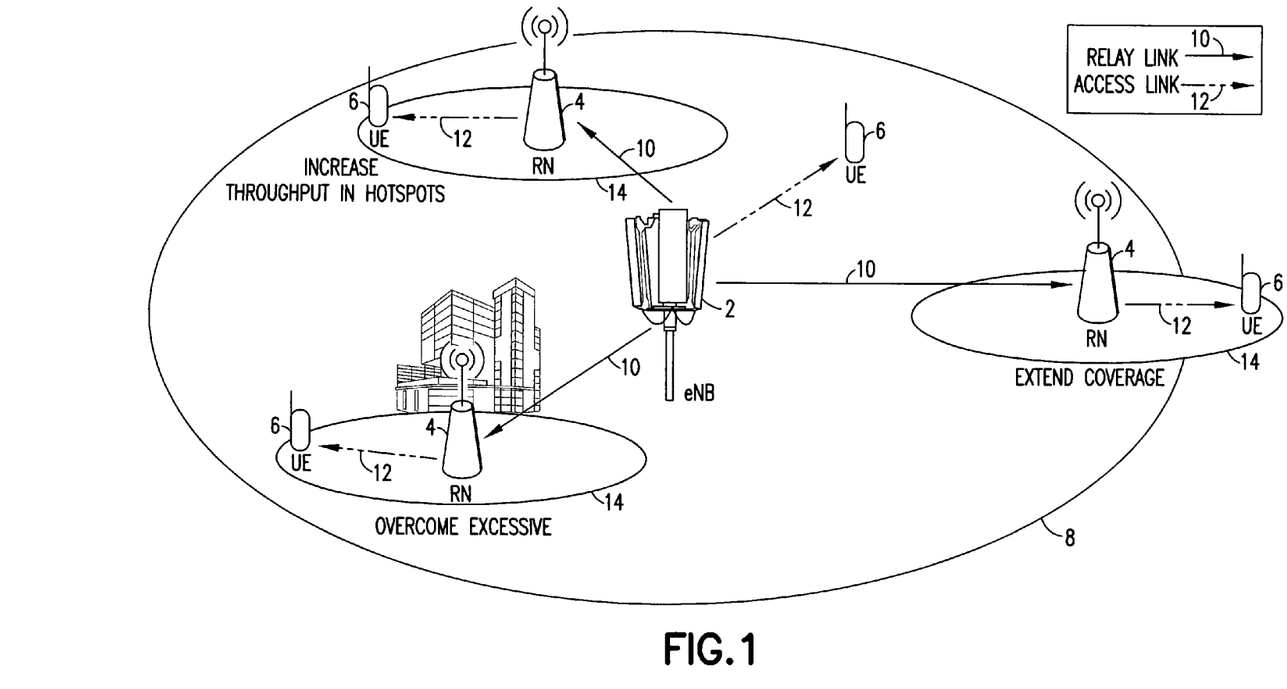
FIG. 1 shows a cell with three relay nodes.

Reference is made to FIG. 1 which shows part of a LTE radio access network (RAN). An access node 2 is provided. The access node can be a base station of a cellular system, a base station of a wireless local area network (WLAN) and/or WiMax (Worldwide Interoperability for Microwave Access). In certain systems the base station is referred to as Node B, or enhanced Node B (e-NB). For example in LTE-A, the base station is referred to as e-NB. The term base station will be used in the following and is intended to include the use of any of these access nodes or any other suitable access node. The base station 2 has a cell 8 associated therewith. In the cell, there is provided three relay nodes 4. This is by way of example only. In practice there may be more or less than three relay nodes. One of the relay nodes 4 is provided dose to the edge of the cell to extend coverage. One of the relay nodes 4 is provided in a traffic hotspot and one of the relay nodes is provided at a location where there is an issue of shadowing from for example buildings. Each of the relay nodes has a coverage area 14 associated therewith. The coverage area may be smaller than the cell 8, of a similar size to the cell or larger than the cell. A relay link 10 is provided between each relay node 4 and the base station 2. The cell has user equipment 6. The user equipment is able to communicate directly with the base station 2 or with the base station 2 via a respective relay node 4 depending on the location of the user equipment 6. In particular, if the user equipment 6 is in the coverage area associated with a relay node, the user equipment may communicate with the relay. The connections between the user equipment and the relay node and the direct connections between the user equipment and the base station are referenced 12.

The UE or any other suitable communication device can be used for accessing various services and/or applications provided via a communication system. In wireless or mobile communication systems the access is provided via an access interface between mobile communication devices (UE) 6 and an appropriate wireless access system. The UE 6 can typically access wirelessly a communication system via at least one base station. The communication devices can access the communication system based on various access techniques, such as code division multiple access (CDMA), or wideband CDMA (WCDMA), the latter technique being used by communication systems based on the third Generation Partnership Project (3GPP) specifications. Other examples include time division multiple access (TDMA), frequency division multiple access (FDMA), space division multiple access (SDMA) and so on. In a wireless system a network entity such as a base station provides an access node for communication devices.

Each UE may have one or more radio channels open at the same time and may receive signals from more than one base station and/or other communication device.

In one embodiment L3 or higher layer relay nodes may be used. L3 is layer 3 of the OSI model and is responsible for source to destination data delivery including routing. Such a relay node may be similar to a base station and support all the radio protocol layers of a normal base station. In a L3 relay the RN is assumed to have a scheduling capability for the access links of the UEs which are registered to that relay node.

In some embodiments of the invention, there may be an issue of backwards compatibility for earlier versions of the standard. For example in one embodiment, from UE's viewpoint, the serving network node should serve Release 8 (of the 3GPP standard) user equipment. Due to this requirement the relays may support at least some and in some embodiments all of the main eNB functions.

In one embodiment of the invention, the system is arranged such that at most 2 hops are allowed in the system (e.g. eNB-UE or eNB-RN-UE). In this embodiment, a tree topology is provided (no direct connections between relay nodes)

However in alternative embodiments of the invention, there may be more than 2 hops. This may occur if, for example, the relays are able to communicate with each other.

A "type 1" RN has been proposed, which is an inband relaying node having a separate physical cell ID (identity), support of HARQ (Hybrid automatic repeat request) feedback and backward compatibility to Release 8 (Ref 8) UEs.

Figure 2:
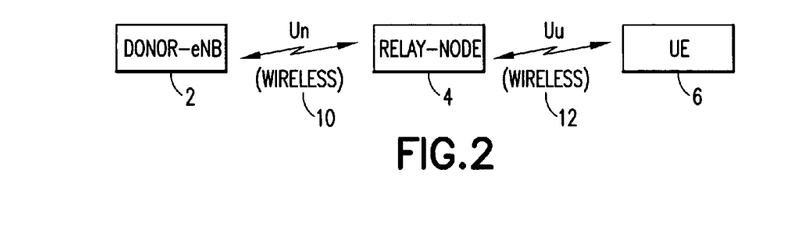
FIG. 2 shows the interfaces between a relay node, a base station and a UE (user equipment)

In the RAN2 #65bis meeting (this is part of 3GPP), RAN 2 agreed with the definition for the nodes and the interfaces as shown in FIG. 2. The wireless interface 12 between UE 6 and RN is named the Uu interface. For those embodiments where backward compatibility is desirable for example where compliance with a particular version of 3GPP standards TR 36.913 and TR36.321 is provided, the Uu interface would be consistent with the Release 8 interface as defined in LTE.

The wireless interface 10 between the RN 4 and the donor e-NB 2 is the Un interface. The link is considered as backhaul link.

In Release 8, Stage 2 of LTE systems, the technique of inter-cell interference coordination (ICIC) has been applied in 3GPP TR 36.300.

Inter-cell interference coordination has the task to manage radio resources (notably the radio resource blocks) such that inter-cell interference is kept under control. ICIC is a multi-cell RRM (radio resource management) function that needs to take into account information (e.g. the resource usage status and traffic load situation) from multiple cells.

The preferred ICIC method may be different in the uplink and downlink connections.

The ICIC function may be located in the eNB.

The "Load Indication" procedure and message in X2 interface are defined within the X2 AP specification of 3GPP TR36.423. The X2 interface is the interface between two eNBs. The purpose of the Load Indication procedure is to transfer load and interference co-ordination information between intra-frequency neighbouring eNBs. The procedure may use non UE-associated signalling.

Figure 3A:
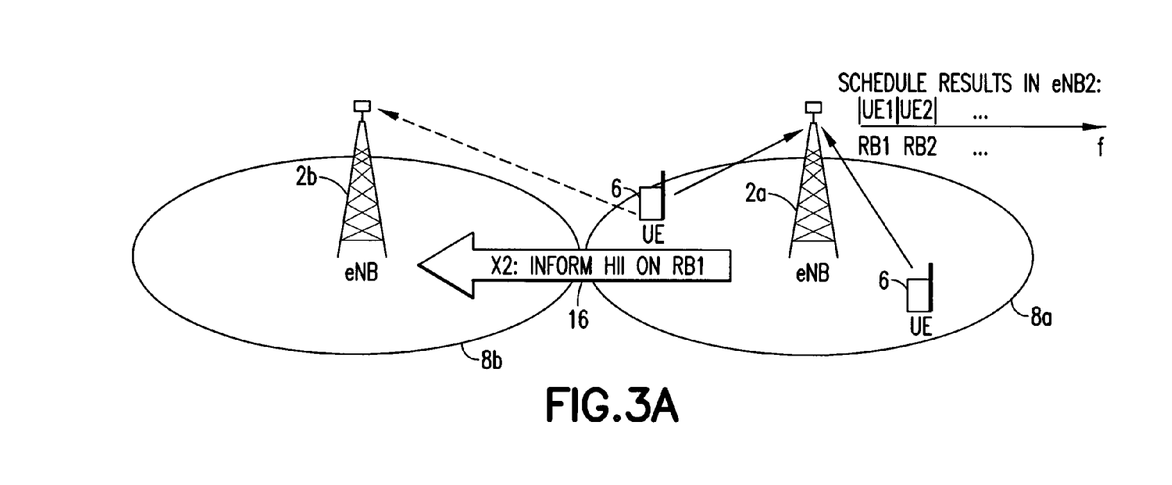
FIG. 3a shows an example of HII based ICIC.
Figure 3B:
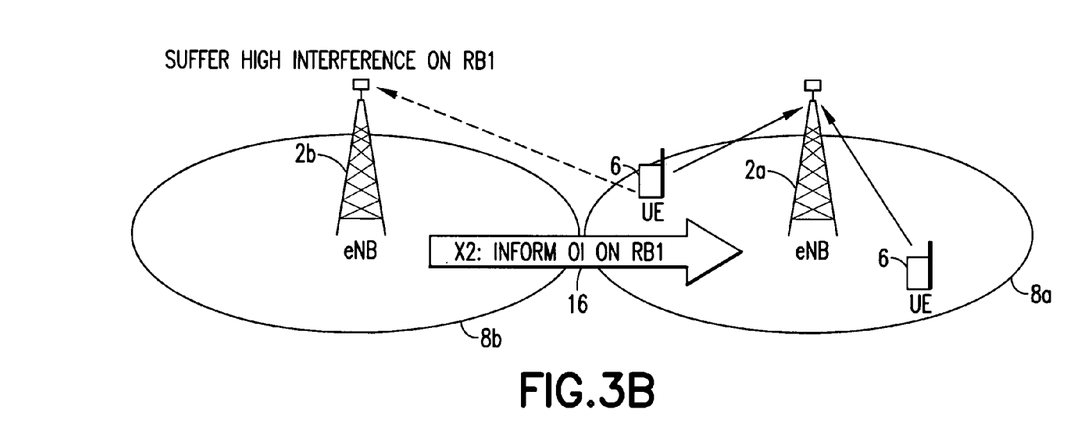
FIG. 3b shows an example of OI based ICIC.

Reference is made to FIGS. 3*a* and 3*b*. Each of these figures shows two base stations 2*a* and 2*b*. Each of these base stations is associated with a respective cell 8*a* and 8*b*. These cells are neighbouring. The first cell 8*a* has two UEs 6 arranged in that cell. The X2 interface between the base stations is referenced 16.

In one embodiment an eNB initiates the procedure by sending a LOAD INFORMATION message to intra-frequency neighbouring eNBs.

The LOAD INFORMATION message can have two IEs (information elements): UL Interference Overload Indication (OI) and UL High Interference Indication (HII), as well as cell ID and Relative Narrowband Tx Power (RNTP) (See 3GPP TR 36.423).

Reference is now made to FIG. 3a. If the UL High Interference Indication IE is received in the LOAD INFORMATION message, it indicates, per PRB (physical resource block), the occurrence of high interference sensitivity, as seen from the sending eNB. In the example shown in FIG. 3a, the LOAD INFORMATION message is being sent from the first base station 2a to the second base station 2b. The receiving eNB, that is the second base station 2b, should try to avoid scheduling cell edge UEs in its cell 8b for the concerned PRBs. The Target Cell ID IE is associated with UL High Interference Indication IE to indicate which cell the HII is meant, as shown in FIG. 3 (a). Thus the LOAD INFORMATION message allows a base station to determine if the message is for that base station, from the Target Cell ID IE.

Reference is now made to FIG. 3b where the message sent on the X2 interface is from the second base station 2b to the first station. If the UL Interference Overload Indication IE is received in the LOAD INFORMATION message, it indicates, per PRB, the interference level experienced by the sending eNB on some resource blocks, as shown in FIG. 3 (b).

Figures 4, 5, 6:
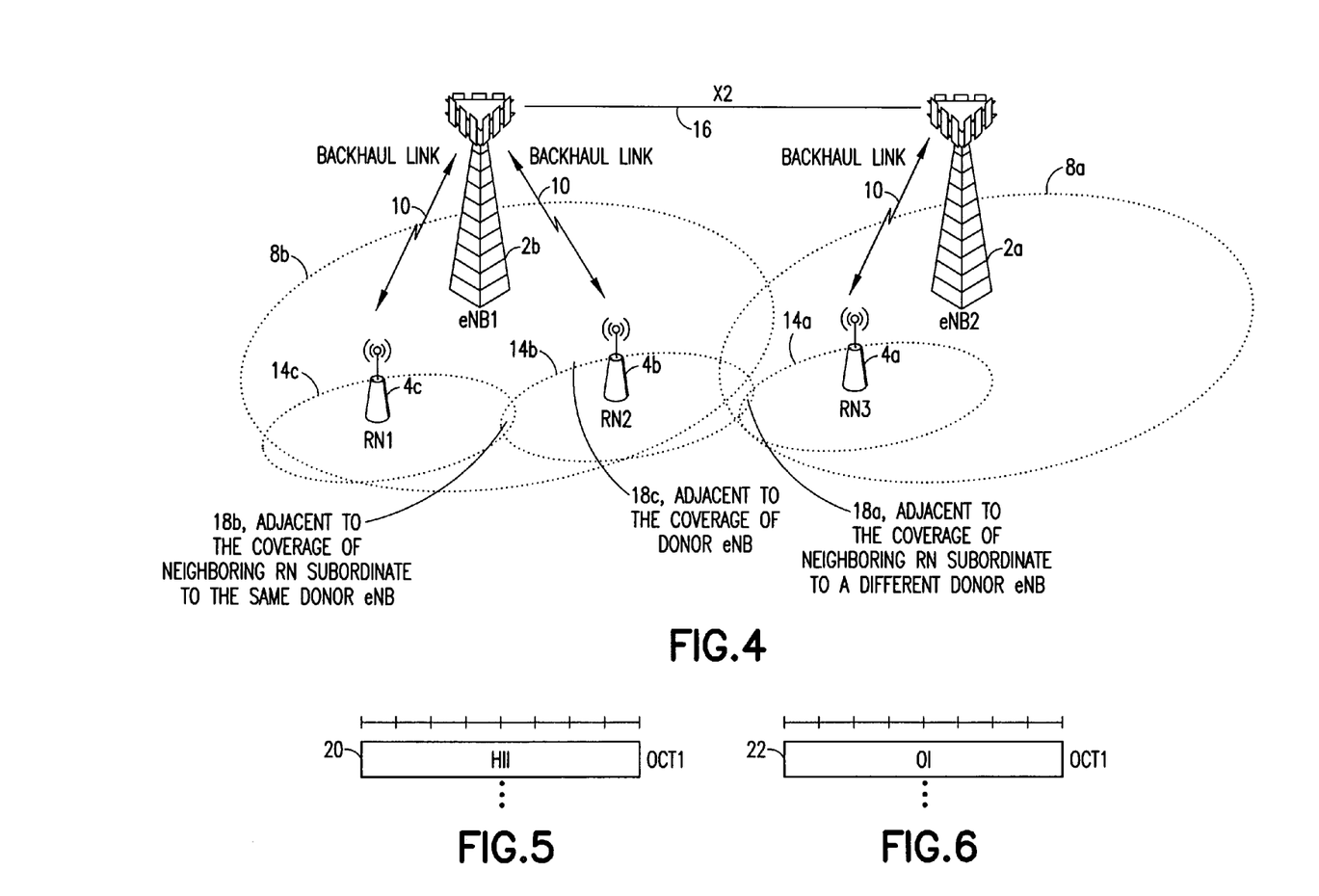
FIG. 4 shows cell edge area of a RN.
FIG. 5 shows a HII MAC control element.
FIG. 6 shows an OI MAC control element.

The relay nodes are introduced to extend cell coverage and enhance the performance for the UEs at cell edge. Some additional areas may become the new edges of cells dominated by RNs. Reference is made to FIG. 4 which shows a first cell 8a with a base station 2a. In this first cell 8a is a first RN 4a with an associated coverage area 14a. A neighbouring second cell 8b is shown with a second base station 2b. This second cell 8b has a second RN 4b with a coverage area 14b and a third RN 4c with a coverage area 14c. As shown in FIG. 4, these newly-generated cell edges can have different kind of adjacent areas:

1) A given coverage area may be adjacent to the coverage area of another RN which is connected to the same eNB (see for example coverage area 14b which is adjacent coverage area 14c and referenced 18b) or a different donor eNB, (see for example coverage area 14b which is adjacent coverage area 14a and reference 18a)
2) a given coverage area of a relay may be adjacent its donor eNB or a neighbour eNB, for example coverage area 14b is adjacent the coverage area of its base station 2b and referenced 18c).

When a UE is located in these edge areas of a RN coverage area, its uplink transmission might suffer from strong intra-cell or inter-cell interference, i.e., from cells of neighbouring RNs, donor eNB, or neighbouring eNBs. ICIC approaches may be used in order to improve the performance of the UE at a RN's coverage area edge. ICIC can help improve the throughput of these UEs by coordinating the resource scheduling between one of more of:

two intra-cell RNs, between a RN and its donor eNB, between two inter-cell RNs, or between RN and a neighbour eNB.

Currently the LOAD INFORMATION message is transferred via the wire line X2 interface between two eNBs, and the Target Cell ID IE is included to indicate the cell for which the corresponding UL High Interference Indication is meant.

LOAD INFORMATION defined in X2 interface can be summarised by tables bellow.

This message is sent by an eNB to neighbouring eNBs to transfer load and interference co-ordination information.

| IE/Group Name | Presence | Range | IE type and reference | Semantics description | Criticality | Assigned Criticality |
|---|---|---|---|---|---|---|
| Message Type | M | | 9.2.13 | | YES | ignore |
| Cell Information | M | | | | YES | ignore |
| >Cell Information Item | | 1 to maxCellineNB | | | EACH | ignore |
| >>Cell ID | M | | ECGI 9.2.14 | Id of the source cell | — | — |
| >>UL Interference Overload Indication | O | | 9.2.17 | | — | — |
| >>UL High Interference Information | | 0 to maxCellineNB | | | | |
| >>>UL High Interference Indication | M | | 9.2.18 | | — | — |
| >>>Target Cell ID | M | | ECGI 9.2.14 | Id of the cell for which the HII is meant | — | — |
| >>Relative Narrowband Tx Power (RNTP) | O | | 9.2.19 | | — | — |

| Range bound | Explanation |
|---|---|
| maxCellineNB | Maximum no. cells that can be served by an eNB. Value is 256. |

However, if the delivery of LOAD INFORMATION is designed, in terms of format and channel establishment, to fit to the characteristics of wireless environment and radio protocol between the donor eNB and its subordinate RNs, a reduction of both the latency and protocol overhead are possible if the location of these messages in the protocol stack is lowered Thus in one embodiment, ICIC is provided via a wireless connection instead of a wire line and a lower layer solution is used.

A multi-hop may exist when LOAD INFORMATION message is exchanged between two network elements (e.g., between two RNs).

The interference and load information between eNB-cell and RN coverage area and interference between backhaul link 10 and access link 12 are asymmetric.

Therefore, one issue of ICIC with relaying is how the LOAD INFORMATION message is transferred via the backhaul link 10 between an eNB and a RN.

In embodiment of the invention, there is proposed a fast ICIC method in relay enhanced LTE networks.

A mechanism to transmit load information in MAC layer (Media Access Control layer) at backhaul link between eNB and RN is provided in one embodiment. The Media Access Control (MAC) data communication protocol sub-layer, also known as the Medium Access Control, is a sub layer of the Data Link Layer specified in the seven-layer OSI model (layer 2). It provides addressing and channel access control mechanisms that make it possible for several terminals or network nodes to communicate within a multipoint network. The MAC sub-layer acts as an interface between the Radio Link Control (RLC) sub layer of layer 2 and the network's physical layer (layer 1).

LOAD INFORMATION messages, including the IEs of HII and/or OI, are transmitted via a newly defined MAC layer channel on backhaul link between the eNB and the RNs. These transmissions can be bi-directional:

1. Downlink from eNB to RN which indicates the load information at eNB, including those generated at the eNB itself, and those generated in other places (for example other RNs including intra-cell and inter-cell RNs, and/or neighbouring eNBs and passed through that eNB; and
2. Uplink from a RN to its associated eNB which indicates the load information generated at the RN itself.

One embodiment of the invention provides a new MAC control element (CE) defined to convey this load information. An exemplified illustration of HII/OI MAC control element is shown in FIGS. 5 and 6. FIG. 5 schematically illustrates a HII MAC control element 20 and FIG. 6 schematically illustrates an OI control element 22. In one embodiment, each of these control elements is in the form of an octet. In alternative embodiments of the invention more or less bits may be allocated for the respective control elements. In one embodiment, a single octet or control element may be provided for conveying the HII and OI information. For example a reference bit may be used to indicate if the information is HII or OI information. Alternatively the same control element may be arranged to provide both HII and OI information. In some embodiments only one of HII and OI information may be provided.

One embodiment of the invention provides new LCID (logical channel identification values) in the DL-SCH (down link synchronisation channel) or UL-SCH MAC PDU (uplink synchronisation channel MAC packet data unit), which are included in the MAC sub header. The new LCID values are defined exclusively for the HII or OI MAC control element. The 3GPP standard 36.321 defines one MAC sub header format. The MAC sub header includes LCID, LENGTH field, etc.

Considering the limited capacity of backhaul link and the regulated size of a MAC PDU, the granularity of HII/OI can be for a group of PRBs instead of a single PRB. However, in alternative embodiments the HII/OI may be defined for each PRB. The LENGTH field is present in the MAC subheader corresponding to the HII or OI MAC control element. The applications of HII and OI may be individual, and depend on high layer configuration and triggering events.

Table 2 below shows the values of the LCID for DL-SCH

| Index | LCID values |
|---|---|
| 00000 | CCCH |
| 00001-01010 | Identity of the logical channel |
| 01011-11011 | Reserved |
| 11100 | UE Contention Resolution Identity |
| 11101 | Timing Advance Command |
| 11110 | DRX Command |
| 11111 | Padding |
| XXXXX | HII |
| XXXXX | OI |

Table 3 below shows the values of the LCID for the UL-SCH.

| Index | LCID values |
|---|---|
| 00000 | CCCH |
| 00001-01010 | Identity of the logical channel |
| 01011-11001 | Reserved |
| 11010 | Power Headroom Report |
| 11011 | C-RNTI |
| 11100 | Truncated BSR |
| 11101 | Short BSR |
| 11110 | Long BSR |
| 11111 | Padding |
| XXXXX | HII |
| XXXXX | OI |

The MAC PDU including HII/OI MAC CE can be transmitted from a RN to the donor eNB or from the donor eNB to the RN. These transmissions may be periodical or event triggered. A timer called PERIODIC_ICIC_TIMER may be configured by a high layer message e.g., RRC messages. These higher layer messages may come from the RRC (radio resource control layer)

This MAC messages may alternatively or additionally be triggered in response to one or more of the following events:

1. The load condition of the physical resource blocks (PRBs) which are granted to the cell edge UEs is varied in which case the ICIC is referred to as "Regular ICIC" For example, reasons for variation could be: 1) channel variation which is the characteristic of wireless channel 2) load change 3) scheduling results since eNB may schedule different UEs to the PRBs at different time 4) load condition variation from other interfering cells (this may cause the change on the detected interference level)
2. DL or UL resources are allocated and the number of padding bits is equal to or larger than the size of the HII/OI MAC control element, in which case the ICIC is referred to as a "Padding ICIC"; Usually one UE could use the radio resource e.g. PRBs once the eNB allocates the resource to it. However, the eNB may not allocate exactly the required resource. Instead, the allocated resource may be more or less than what the UE needs. In case the allocated resource is more than UE's requirement, the UE would fill in the redundant resource with some useless bits, called padding bits. Then if the available resource for padding bits is enough to accommodate the ICIC message, the ICIC message may be inserted. This is one way to utilize the unused resource to transmit ICIC message.
3. The PERIODIC_ICIC_TIMER expires, in which case the ICIC is referred to as "Periodic ICIC";

The latency of above MAC procedures may be of the order of several TTIs (transmission time intervals), which is much smaller than the latency of the high-layer message delivery in the X2 interface. Further the overhead in the MAC PDU can be optimised so that the overhead cost is also reduced greatly compared to the higher layer X2 AP messages. AP is "Application protocol". It defines the contents of the messages delivered over wired connection of the X2 interface. Since the messages are transmitted over the IP layer, some headers are needed e.g. IP/RTP (Internet Protocol/Real time protocol) headers etc. Generally the higher layer, the more headers are added to the message. If the ICIC is transferred over MAC layer, the headers required may be reduced.

At the backhaul link between the eNB and the RN, the Target Cell ID IE is associated with the corresponding HII MAC CE (control element), e.g., by being added into the corresponding MAC subheader. The target cell may be associated with the control element in any suitable manner in alternative embodiments of the invention. If the destination is an RN, the target cell ID includes the identities of both RN and its donor eNB. Additionally or alternatively, multiple target cells can be indicated together since the interference may come from more than one neighbour eNB and/or RN cells.

Some further optimized format regulations can be given to aggregate the multiple target cell IDs. For example, a table may be provided combining the multiple cell IDs into one LOAD MESSAGE. This contrasts with current proposals where there is only one target cell ID within the LOAD message. The content and format of the X2 interface may be modified accordingly in line with the format of the backhaul link.

The LOAD INFORMATION messages initiated from RNs need go through donor eNB. Various embodiments for the delivery of these messages will now be described.

Figure 7A:
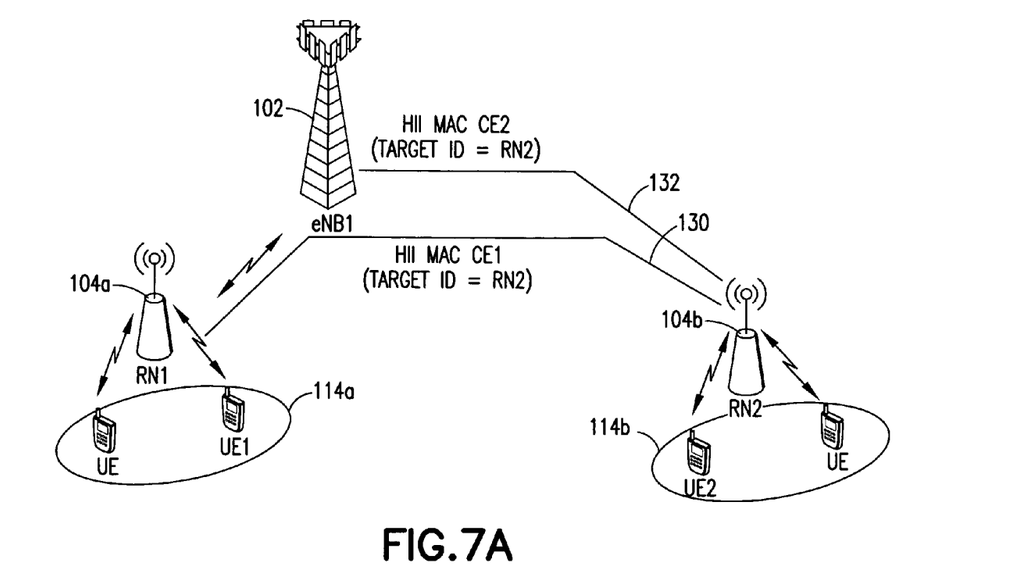
FIG. 7a show independent LOAD INFORMATION delivery.

1. Independent LOAD INFORMATION message depending on the initiating node—in this method, the LOAD INFORMATION message including the HII and/or OI MAC CE is delivered respectively from RN and its donor e-NB to the destination. In this regard reference is made to FIG. 7a which shows a base station 102 (for example a donor e-Node B) and two relay nodes 104a and 104b associated with that base station. Each of the relay nodes 104a and b has a respective associated coverage area 114a and 114b. As shown in FIG. 7a, the line 130 shows the HII status which is received at the second relay node 104b from the first relay node 104a. The donor eNB may only forwards the message transparently. The target ID is that of the second relay node 104b. The line 132 shows the HII status from the donor eNB access cell, received at the second relay node with the target ID again that of second relay node.

Figure 7B:
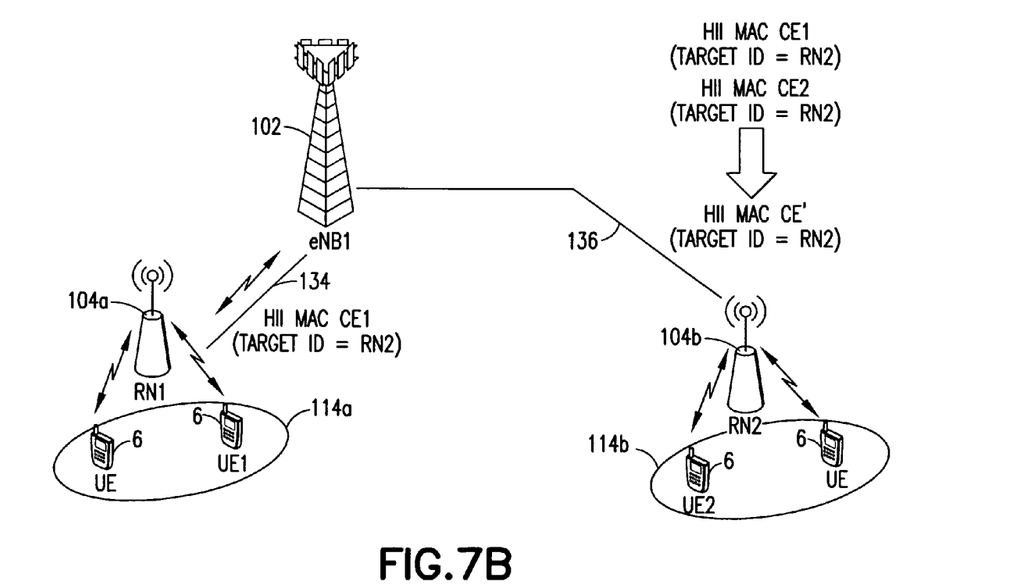
FIG. 7b shows harmonized LOAD INFORMATION message delivery.

2. In this embodiment, harmonized LOAD information messages are used. Reference is made to FIG. 7b which shows a similar arrangement to that of FIG. 7a but shows a different message delivery. In this embodiment, the donor eNB 102 is responsible for rebuilding or defining a new LOAD INFORMATION message by combining all the LOAD INFORMATION messages available at that eNB which are destined to same target. That target may be a particular relay node or another eNB. Since the HII and OI CE are defined in terms of PRBs, it is possible to aggregate the interference level and interference sensitivity over each PRB into one HII MAC CE and then deliver the aggregation to the destination. As shown in FIG. 7b, eNB1 102 combines the HII MAC CE received from the first RN 104a (see line 134) and the HII information initiated from its access cell, and then rebuild or defines a new HII MAC CE' and sends this to the target relay node 104b (see line 136). This method may decrease the overhead for ICIC without degrading the performance. Especially when the target cell is an RN, this further saves the resource usage over backhaul link.

HII CE is an element organized in terms of PRBs. HII CE may be a bit string wherein each position in the bitmap represents a PRB, for which value "1" indicates "high interference sensitivity" and value "0" indicates "low interference sensitivity". In alternative embodiments, the values may have the opposite meaning. When the donor eNB has more than one HII CEs destined to the same node as in FIG. 7b, the donor eNB would build a new string by comparing these bit strings in digits: if there is value "1" indicated at the digit in any of the bit strings, the digit in the new string is set to value "1"; otherwise, the digit is set to value "0". The length of the new bit string is the same as these bit strings.

| IE/ Group Name | Presence | Range | IE type and reference | Semantics description |
|---|---|---|---|---|
| HII | M | | BIT STRING (1 ... 110, ...) | Each position in the bitmap represents a PRB (first bit = PRB 0 and so on), for which value "1" indicates 'high interference sensitivity' and value "0" indicates 'low interference sensitivity'. The maximum number of Physical Resource Blocks is 110 |

Some embodiments of the invention may use a combination of these two approaches for message delivery.

Intra-cell and inter-cell scenarios will now be discussed. One characteristic in relaying systems sometimes present is: asymmetry between backhaul link (between bases station and relay node) and access link (between relay node and UE or between eNB and UE): backhaul link is expected to use higher uplink power and have larger amount of load information than the access link.

Figure 8A:
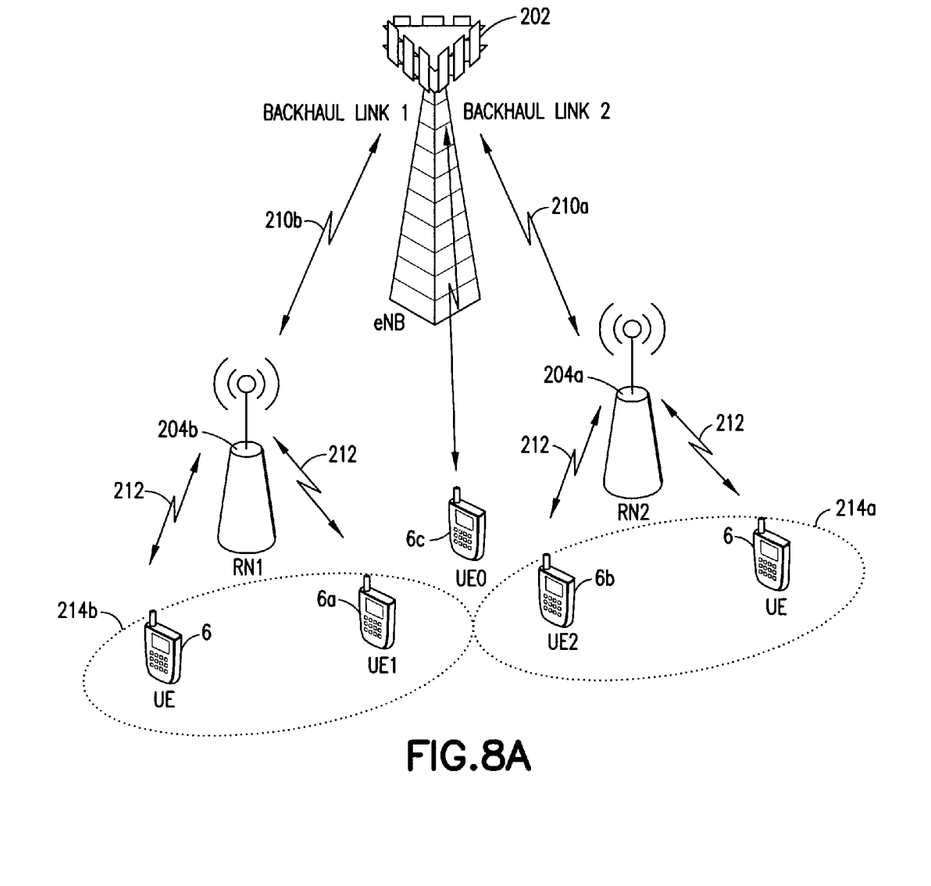
FIG. 8a shows intra-cell scenarios.

Various intra-cell scenarios are shown in FIG. 8a. Here the parameters regarding HII/OI MAC CE, including the period and trigger events, are configured by the eNB 202.

Consider a first scenario. First UE 6a is registered to a first relay node 204b and UE 6b is registered to the second relay node 204a and both lie in the border of these two RN coverage areas or cells. Interference between the first UE 6a uplink access and the second UE 6b uplink access is possible. This kind of interference is similar to that between two traditional eNBs without RNs and impacts mutually. The ICIC is executed between the first RN 204b and the second RN 204a. The ICIC message passes through 2 hops including the first backhaul link 210b and the second backhaul link 210a. The transfer of the ICIC message is bi-directional, i.e., from the first RN 204b to the second RN 204a or from the second RN 204a to the first RN 204b, both passing through the eNB 202.

Consider a second scenario. The first UE 6a registered to the first RN 204b and a third UE0 6c registered to the eNB 202 lie in the border of these two RN coverage areas and the eNB-cell. The first UE 6a is in the coverage area of the first RN 204b but adjacent the border of that cell, adjacent the coverage are of the second RN 204a and the coverage area where communication would be with the eNB 202. The third UE 6c is in the coverage area where communication would be with the eNB 202 but adjacent the coverage areas of the two RNs. The interference between third UE's 6c uplink access and first UE's 6a uplink access is possible. The ICIC is executed between the first RN 204b and the eNB 202. The ICIC information passes through 1 hop, i.e., via backhaul link 1-210*b*. The transfer of the ICIC messages are bi-directional, i.e., from the first RN 204*b* to the eNB 202 or from the eNB 202 to the first RN 204*b*.

Consider a third scenario. The first UE 6*a* registered to the first RN 204*b* is. Since in general the uplink transmit power in backhaul link 210 is higher than that in the access link 212, interference from the second RN 204*a* uplink backhaul to UE1's uplink access 212 to the first RN 204*b* is possible. The ICIC is executed between the first RN 204*b* and the eNB 202. The ICIC information passes through 1 hop, i.e., via backhaul link 210*b*. It may be preferable to apply single-directional (from the first RN 204*b* to the eNB 202) transfer, because in general the amount of backhaul scheduling information is much larger than the amount of access scheduling information.

Figure 8B:
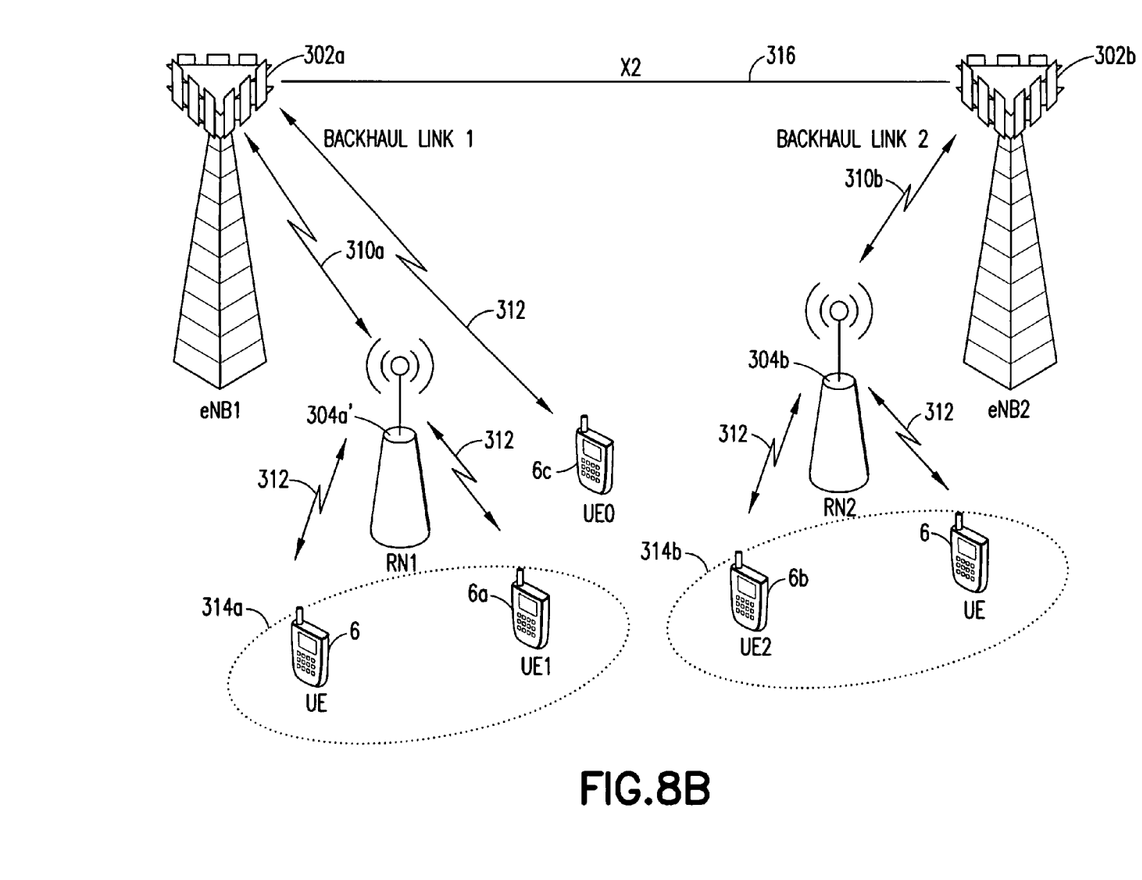
FIG. 8*b* shows inter-cell scenarios.

Various inter-cell scenario as shown in FIG. 8*b*. In this embodiment, the parameters regarding HII/OI MAC CE, including the period and/or trigger events, are configured by the first eNB1 302*a* and eNB2 302*b*, respectively.

In a first scenario, the first UE1 6*a* is registered to the first RN 304*a* which is associated with the first eNB 302*a*. A second UE2 6*b* is registered to a second RN 304*b* which is associated with the second eNB 302*b*. The first and second UEs lie in the border of these two RN cells or coverage areas. Interference between the first UE 6*a* uplink access and the second UE 6*b* uplink access is possible.

The ICIC is executed between the first and second relay nodes. The ICIC information passes through 3 hops including the backhaul link 1 310*a* (between the first relay node and the first eNB), the X2 connection 316 between the eNBs and backhaul link 2 310*b* (between the second eNB and the second RN).

The transfer of the ICIC message is bi-directional, i.e., from the first RN to the second RN or vice versa.

In a second scenario, a second UE 6*b* registered to the second RN 304*b* and a third UE 6*c* is registered to the first eNB 302*a*. The second UE 6*b* is in the coverage area of the second RN 304*b* which is associated with the second eNB 302 but close to a border area of the coverage area. The third UE 6*c* is associated with the first eNB 302*a* but lies close to the border of the coverage area of the second RN 304*b*. Interference from the third UE's uplink access and the second UE's uplink access is possible. The ICIC is executed between the second RN 304*b* and the first eNB 302*a*. The ICIC information passes through 2 hops including backhaul link 2 310*b* and the X2 interface 316. The transfer of the ICIC message is bi-directional, i.e., from the first eNB 202*a* to the second RN or vice versa.

In a third scenario, the first UE 6*a* as described above, which is registered to the first RN 304*a* is granted for uplink access transfer, while the second RN 304*b* is granted for uplink backhaul transfer. Interference from the second RN uplink backhaul link 310*b* to first UE's uplink access 312 is possible. The ICIC is executed between the first RN 304*a* and the second eNB 202. The ICIC information passes through 2 hops including the first backhaul link 1 310*a* and the X2 interface 316. It may be preferable to apply single-directional (from the first RN 304*a* to the second eNB 202*b*) transfer, because in general the backhaul scheduling information is much more than the access scheduling information.

Figure 9:
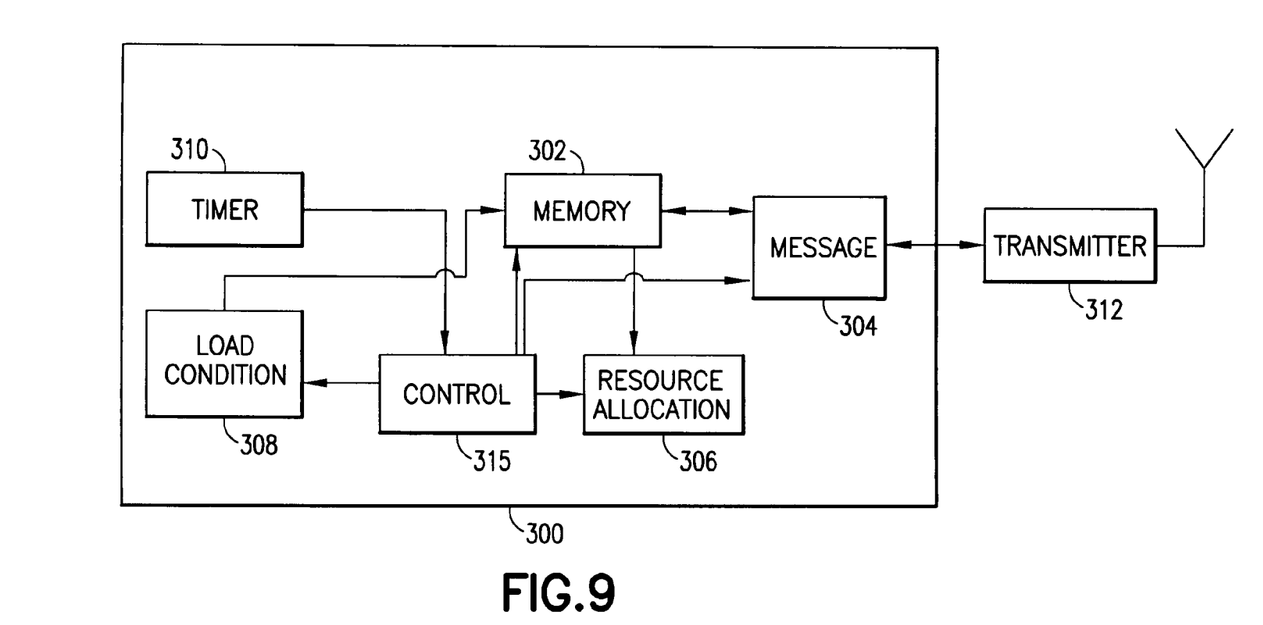
FIG. 9 shows a node embodying the invention

Reference is made to FIG. 9 which shows a node 50 embodying the invention. This node may be a base station or a relay node. In particular, a data processing part 300 of the node is shown. This data processing part is connected to a transmitter/receiver part 312 which up converts data to be sent to a radio frequency and which down converts data which is received to baseband. The transmitter/receiver part 312 is connected to an antenna arrangement 313 which is arranged to transmit and receive signal.

The data processing part 300 comprises a store 302 which is arranged to store at least one of load information to be sent to at least one other nodes and information received from at least one other node. It should be appreciated that where information to be sent and information which is to be received are stored, that information may be stored in a common memory or separate memories. A conversion block 304 is provided to put the information into the MAC sub header, for transmission. The conversion block may alternatively or additionally extract the load information from the MAC sub header and cause that information to be stored.

The node comprises a load condition block 308 which is arranged to determine that there is a load condition, e.g. an overload indication or a high interference indication and cause that information to be stored in the load information store 302.

A resource allocation block 306 is arranged to control resource allocation in dependence on the received load information, which is received from the load information store 302.

A control block 315 is arranged to control the resource allocation block 306, the load condition block 308 and the conversion block 304. For example, the control block 315 may control when checks are made for load conditions, when the resource allocation is performed by the resource allocation block 306 and/or when messages are sent by the message conversion block 304. A timer 310 may optionally be provided which provides a timing output to the control block to control for example the timing as to when the messages are sent.

One or more of these blocks may be omitted.

In one embodiment, a base station would carry at least some of the control functions for the relay node and as such the control block in the relay node may be simplified.

The processing part 300 may be implemented by one or more integrated circuits. The memory may be part of one or more of the integrated circuits or may be separately provided.

The above embodiments may be based on an assumption in LTE-A that an RN performs autonomic scheduling without being controlled by its donor eNB. In a modification to this, an eNB can give some guidelines or configuration information to its subordinate RNs to assist in or define scheduling and interference coordination. In this case, the role of HII from a RN to an eNB can be at least partially replaced by control by the eNB. OI may still be used from an RN to eNB to report interference which might come from one or more neighbour cells.

In one or more embodiments of the invention, LOAD INFORMATION messages, including the IEs of HII and OI, are transmitted via a newly defined MAC layer channel via a backhaul link between eNB and RN.

New types of MAC control element (CE) may be defined to convey these load information.

The policies to transmit MAC PDU including HII/OI MAC CE may be periodical or event triggered. A timer called PERIODIC_ICIC_TIMER can be configured. Three kinds of ICIC MAC CEs may be defined: regular ICIC, padding ICIC, and periodic ICIC.

A target Cell ID IE may be associated with the corresponding HII MAC CE, e.g., by being added into the corresponding MAC subheader, and can aggregate multiple destination cells.

LOAD INFORMATION messages that are targeted to the same destination may be harmonized at a donor-eNB to reduce the delivery overload.

In case of interference from backhaul link to access link, the load information (HII and/or OI) may be is transmitted from an RN to its donor-eNB as a backhaul scheduling reference at donor-eNB. The load information at the RN helps the donor eNB schedule the backhaul resource to avoid conflict.

Embodiments of the invention may be implemented when one or more RNs are deployed intra-cell or inter-cell. Though relaying can help extend coverage of the traditional cellular network, the UE's performance at cell edge may be a bottleneck limited by interferences from other RN-cell or neighbour eNB-cell. Embodiments of this invention may provide a mechanism, which is suitable for use with the backhaul link properties. Embodiments of the invention may support low latency and have a small protocol overhead, to enhance the access link's performance for the RN-cell edge UEs By utilizing this mechanism together with a RRM (radio resource management algorithm), a trade-off and balance between backhaul and access may be achieved.

A non-limiting example of mobile architectures where the herein described principles may be applied is known as the Evolved Universal Terrestrial Radio Access Network (E-UTRAN). The eNBs may provide E-UTRAN features such as user plane Radio Link Control/Medium Access Control/Physical layer protocol (RLC/MAC/PHY) and control plane Radio Resource Control (RRC) protocol terminations towards the user devices.

In alternative embodiments, the messages can be sent in other Layer 2 messages, other than on the MAC layer. In alternative embodiments, the messages may be sent on other layers.

It should be appreciated that in those embodiments where there is a wired connection between the base station and the relay node, the communication between the base station and the relay node will be via the wired connection.

At least some of the processing of processing block may be carried out by one or more processors in conjunction with one or more memories.

Processing block may be provided by an integrated circuit or a chip set.

At least some of the processing block may alternatively or additionally be provided by a controller of the access points, for example a radio network controller or the like.

The required data processing apparatus and functions of a relay node and a base station apparatus as well as an appropriate communication device may be provided by means of one or more data processors. The above described functions may be provided by separate processors or by an integrated processor. The data processing may be distributed across several data processing modules. A data processor may be provided by means of, for example, at least one chip. Appropriate memory capacity can also be provided in the relevant nodes. An appropriately adapted computer program code product or products may be used for implementing the embodiments, when loaded on an appropriate data processing apparatus, for example in a processor apparatus associated with the base station, processing apparatus associated with relay node and/or a data processing apparatus associated with a UE. The program code product for providing the operation may be stored on, provided and embodied by means of an appropriate carrier medium. An appropriate computer program can be embodied on a computer readable record medium. A possibility is to download the program code product via a data network.

It is noted that whilst embodiments have been described in relation to LTE, similar principles can be applied to any other communication system where relaying is employed. Therefore, although certain embodiments were described above by way of example with reference to certain exemplifying architectures for wireless networks, technologies and standards, embodiments may be applied to any other suitable forms of communication systems than those illustrated and described herein.

It should be noted that although embodiments of the invention have been described in the context of relative high carrier frequencies, embodiments of the invention can be used with lower frequency carriers.

It is also noted herein that while the above describes exemplifying embodiments of the invention, there are several variations and modifications which may be made to the disclosed solution without departing from the scope of the present invention.

The invention claimed is:

1. A method comprising:
   determining load information at one of an access node and a relay node associated with said access node,
      wherein said load information comprises one or more of an interference overload condition and a high interference condition,
      wherein the interference overload condition indicates the interference level experienced by the one of said access node and said relay node associated with said access node, and
      wherein the high interference condition indicates the occurrence of high interference sensitivity associated with the one of said access node and said relay node associated with said access node; and
   sending said load information from one of an access node and a relay node associated with said access node to the other of said relay node and access node.

2. The method as claimed in claim 1, wherein said sending further comprises sending said load information in layer 2 defined in an OSI Open systems interconnection model.

3. The method as claimed in claim 2, wherein said sending further comprises sending said load information in a medium access control layer.

4. The method as claimed in claim 1, further comprising sending information indicating said other of said relay node and access node for which said load information is intended.

5. The method as claimed in claim 1, further comprising sending said load information periodically.

6. The method as claimed in claim 1, further comprising sending said load information periodically in response to an expiry of a timer.

7. The method as claimed in claim 1, further comprising sending said load information in response to a change in a load condition of a resource.

8. The method as claimed in claim 1, further comprising sending said information using resource which is allocated and unused.

9. The method as claimed in claim 1, further comprising combining different load information for said other of said relay node and access node and sending said combined different load information to said other of said relay node and access node.

10. The method as claimed in claim 1, further comprising combining load information for a plurality of resources.

11. The method as claimed in claim 1, wherein said load information is in an information element.

12. The method as claimed in claim 1, wherein said load information further comprises at least one octet.

13. The method as claimed in claim 1, wherein said load information is provided in a header.

14. The method of claim 1, further comprising: controlling resource allocation in dependence on the received load information.

15. A computer program product embodied on a non-transitory computer-readable medium, in which a computer program is stored which, when being executed by a computer, is configured to provide instructions to control or carry out:
determining load information at one of an access node and a relay node associated with said access node,
wherein said load information comprises one or more of an interference overload condition and a high interference condition,
wherein the interference overload condition indicates the interference level experienced by the one of said access node and said relay node associated with said access node, and
wherein the high interference condition indicates the occurrence of high interference sensitivity associated with the one of said access node and said relay node associated with said access node; and
sending said load information from one of an access node and a relay node associated with said access node to the other of said relay node and access node.

16. An apparatus comprising:
at least one processor, and
at least one memory including computer program code,
the at least one memory and the computer code configured to, with the at least one processor, cause the apparatus to at least perform the following:
determining load information at one of an access node and a relay node associated with said access node,
wherein said load information comprises one or more of an interference overload condition and a high interference condition,
wherein the interference overload condition indicates the interference level experienced by the one of said access node and said relay node associated with said access node, and
wherein the high interference condition indicates the occurrence of high interference sensitivity associated with the one of said access node and said relay node associated with said access node; and
sending said load information from one of an access node and a relay node associated with said access node to the other of said relay node and access node.

17. The apparatus as claimed in claim 16, wherein the at least one memory and the computer program code being configured, with the at least one processor, to cause the apparatus to further perform: providing said load information in a layer 2 message, where layer 2 is as defined in an OSI Open systems interconnection model.

18. The apparatus as claimed in claim 16, wherein the at least one memory and the computer program code being configured, with the at least one processor, to cause the apparatus to further perform: providing said load information in a medium access control layer message.

19. The apparatus as claimed in claim 16, wherein the at least one memory and the computer program code being configured, with the at least one processor, to cause the apparatus to further perform: providing information indicating said other of said relay node and access node for which said load information is intended.

20. The apparatus as claimed in claim 16, wherein the at least one memory and the computer program code being configured, with the at least one processor, to cause the apparatus to further perform: causing said load information to be sent periodically.

21. The apparatus as claimed in claim 16, further comprising a timer.

22. The apparatus as claimed in claim 16, wherein the at least one memory and the computer program code being configured, with the at least one processor, to cause the apparatus to further perform:
determining a change in a load condition of a resource, and providing said load information in response to determining a change in a load condition of a resource.

23. The apparatus as claimed in claim 16, wherein the at least one memory and the computer program code being configured, with the at least one processor, to cause the apparatus to further perform: determining if a resource which has been allocated has an unused portion and allocating at least a part of said unused portion for said load information.

24. Apparatus as claimed in claim 16, wherein the at least one memory and the computer program code being configured, with the at least one processor, to cause the apparatus to further perform: storing said load information.

25. An integrated circuit or chip set comprising an apparatus as claimed in claim 16.

26. Apparatus as claimed in claim 16, comprising a transmitter for transmitting said load information.

27. A node comprising an apparatus as claimed in claim 16.

28. A node as claimed in claim 27, said node comprising an access node or a relay node.

29. The apparatus of claim 24, wherein the stored load information stores at least one of load information to be sent to at least one other node and load information received from at least one other node.

* * * * *